United States Patent

Kabler

[15] 3,638,401
[45] Feb. 1, 1972

[54] VACUUM CONNECTOR FOR CONNECTING REPLACEABLE EVACUATED DEVICES TO AN EVACUATED SYSTEM

[72] Inventor: Donald J. Kabler, Fremont, Calif.
[73] Assignee: Varian Associates, Palo Alto, Calif.
[22] Filed: Mar. 24, 1969
[21] Appl. No.: 809,858

[52] U.S. Cl. .................................55/158, 55/270, 55/316, 55/389
[51] Int. Cl. ..................................B01d 53/22, B01d 50/00
[58] Field of Search...............55/16, 76, 158, 208, 195, 270, 55/356, 357, 359, 387, 389, 316; 20/233, 235; 417/48–51, 901

[56] References Cited

UNITED STATES PATENTS

| | | | |
|---|---|---|---|
| 2,145,683 | 1/1939 | Bostock | 55/359 X |
| 3,118,288 | 1/1964 | Small | 210/233 UX |
| 3,258,896 | 7/1966 | Muller | 55/16 |

Primary Examiner—John Adee
Attorney—Stanley Z. Cole

[57] ABSTRACT

A vacuum connector is disclosed for connecting secondary replaceable evacuated devices to a primary evacuated system without contamination of the primary system. A gas passageway is connected to the primary evacuated system. A valve spring loaded to the normally closed position, is provided in the gas passageway closing same. The secondary evacuated structure, to be connected to the primary evacuated system, is sealed by means of a diaphragm. An O-ring seal is provided for sealing the secondary replaceable evacuated structure to the wall of the gas passageway. A cutting tool is provided in the gas passageway between the valve and the diaphragm for cutting the diaphragm, thereby opening same. The cutting tool also engages the valve for opening the valve against the spring bias to place the secondary evacuated structure into gas communication with the primary evacuated system through the valve. Removal of the secondary evacuated structure causes the spring bias force to close the valve, thereby sealing the primary evacuated system for subsequent connection to a second replaceable secondary evacuated device.

1 Claims, 4 Drawing Figures

PATENTED FEB 1 1972 3,538,401

INVENTOR.
DONALD J. KABLER
BY
Stanley F. Cole
ATTORNEY 3,638,401

VACUUM CONNECTOR FOR CONNECTING REPLACEABLE EVACUATED DEVICES TO AN EVACUATED SYSTEM

DESCRIPTION OF THE PRIOR ART

Heretofore, replaceable secondary evacuated devices have been connected to a primary evacuated system by means of a gas passageway having two valves serially disposed therein. One of the valves is affixed to a gas passageway connected to the primary system and the second valve is connected to a portion of the gas passageway affixed to the replaceable secondary vacuum system. With both primary and secondary vacuum system evacuated, the two portions of the gas passageway are coupled together in a gastight manner and then the two valves may be opened for interconnecting the two systems. The problem with this arrangement is it requires two relatively expensive high vacuum valves, one of which must be affixed to the secondary replaceable system and, thus, must either be repairable or expendable.

SUMMARY OF THE PRESENT INVENTION

A principal object of the present invention is the provision of an improved vacuum connector for connecting replaceable secondary evacuated devices to a primary evacuated system.

One feature of the present invention is the provision of a gas passageway for interconnecting the evacuated primary system and the evacuated replaceable secondary system with a valve sealing the passageway and a diaphragm sealing the secondary system with means between the valve and the secondary system for piercing the diaphragm and placing the secondary system in gas communication with the primary system through the gas passageway and valve.

Another feature of the present invention is the same as the preceding feature wherein the means for piercing the diaphragm includes a tubular cutting tool for providing a gas passageway into the secondary structure via the hollow interior of the cutting tool.

Another feature of the present invention is the same as any one or more of the preceding features wherein the valve is spring-biased into a normally closed position and including means actuated by movement of the replaceable secondary structure for opening the valve after the diaphragm has been pierced.

Another feature of the present invention is the same as any one or more of the preceding features wherein the primary evacuated structure includes a membrane gas separator and the secondary evacuated structure comprises a sorption vacuum pump for pumping on the gas separator and including a mass spectrometer connected to the output of the gas separator for analyzing the separated constituents of the gas fed to the gas separator.

Other features and advantages of the present invention will become apparent upon a perusal of the following specification taken in connection with the accompanying drawings wherein:

DESCRIPTION OF THE PREFERRED EMBODIMENTS

Figure 1:
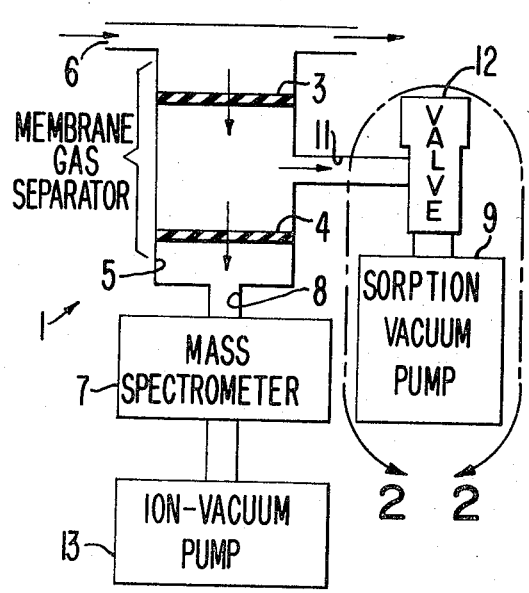
FIG. 1 is a schematic line diagram, partly in block diagram form, of a gas analysis system incorporating features of the present invention.

Referring now to FIG. 1, there is shown a gas analysis system 1 incorporating features of the present invention. The gas analysis system is portable such that it may be hand-carried in the field and employs a membrane gas separator 2 of the general type described and claimed in copending U.S. application Ser. No. 511,756 filed Dec. 6, 1965 now U.S. Pat. No. 3,455,092 and assigned to the same assignee as the present invention. The membrane gas separator includes a pair of membranes 3 and 4 serially disposed of a gas passageway 5 which interconnects a source of gas to be analyzed, such as the atmosphere, at input port 6 to the input of a mass spectrometer 7 which is connected to the output port 8 of the gas separator 2. The membranes 3 and 4, as of silicon rubber, are vastly more permeable to organic gaseous constituents of the gas being analyzed than they are to nonhydrocarbon permanent gas components of the gaseous atmosphere, such as oxygen, nitrogen, etc. A portable vacuum pump, such as a sorption vacuum pump 9, is interconnected to the region between the membranes 3 and 4 via gas passageway 11 and valve 12 for pumping on the space between the membranes 3 and 4 to produce a pressure differential across membrane 3 to facilitate flow of gas, to be analyzed, through the membrane gas separator 2. The hydrocarbon enriched gas, which passes through the second membrane 4, is fed to the mass spectrometer 7. The mass spectrometer 7 is pumped by means of an ion vacuum pump 13, as of the multiple cell Penning type, to reduce the pressure in the mass spectrometer to approximately $10^{-6}$ Torr. The sorption vacuum pump 9 reduces the pressure in the region between membranes 3 and 4 to on the order of between $1\times10^{-3}$ and 10 Torr. A typical sorption pump canister 9 having a volume of approximately 1.0 liters is filled with a molecular sieve sorption material and has sufficient pumping capacity to pump the membrane gas separator 2 for approximately 24 hours of continuous service.

Figure 2:
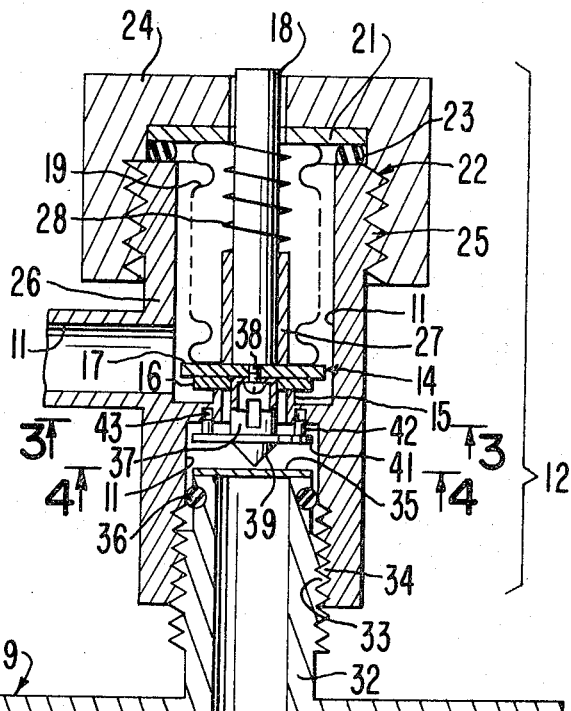
FIG. 2 is an enlarged sectional view of a portion of the structure of FIG. 1 delineated by line 2—2.

Referring now to FIG. 2, the valve 12 and sorption vacuum pump connection is shown in greater detail. The gas passageway 11 which interconnects the sorption vacuum pump 9 with the membrane gas separator 2 includes a valve structure 14 which seals the gas passageway 11. The valve structure 14 includes an annular valve seat 15 defining a marginal lip portion of the gas passageway 11. An annular valve disc 16 of a resilient sealing material, such as Neoprene rubber, is carried on a retaining plate 17, as of stainless steel, which in turn is fixed securely to a valve stem 18.

A stainless steel bellows 19 surrounds the valve stem 18 and is sealed at its inner end to the valve retaining plate 17 and at its outer end to an annular sealing member 21 which in turn is sealed to a housing structure 22 of the valve via an O-ring 23. A threaded cap 24 is threadedly mated with threads 25 provided on the outside of a tubular extension 26 of the valve housing 22. The cap 24 serves to capture the sealing disc 21 and to press the disc against the O-ring 23 for producing a vacuum tight seal to the housing 22.

A sleeve 27 surrounds the valve stem 18 and a compression spring 28 is captured between the end of the sleeve 27 and the cap 24 for spring-biasing the valve 16 into sealing engagement with the valve seat 15. The spring bias force is adjustable by lengthening or shortening the length of the sleeve 27 to provide more or less compression of spring 28 when the cap 24 is in the fully seated condition.

The sorption vacuum pump 9 includes a hollow cylindrical canister 31, as of stainless steel, which is filled with approximately 1.0 liters of molecular sieve sorption material. A suitable sieve material is Union Carbide 10X molecular sieve. The canister 31, in a typical embodiment, is 3.5 inches in diameter and 7 inches long. A tube 32 is sealed to the top of the canister 31 and is provided with external threads 33 for mating with internal threads 34 at an open end of the valve housing 22.

A thin stainless steel diaphragm 35 is sealed over the end of the tube 32 such that the sorption vacuum pump 9 can be preprocessed prior to use, as by baking, to 600° C. while being evacuated by means of an exhaust tubulation, not shown, to a relatively low pressure, as of $10^{-7}$ Torr. After the pump has been processed, the exhaust tubulation, not shown, is pinched off and the vacuum is maintained by means of the thin diaphragm 35 as of 0.003 inches stainless steel foil brazed over the end of the tube 32. An O-ring 36, as of Neoprene rubber, is carried within an annular groove near the end of the tube 32 for sealing engagement with the inner bore of the gas passageway 11.

Figure 3:
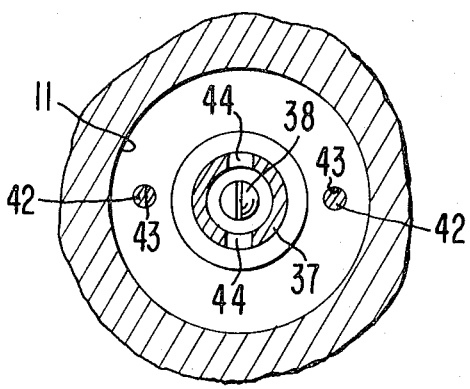
FIG. 3 is an enlarged sectional view of a portion of the structure of FIG. 2 taken along line 3—3 in the direction of the arrows.
Figure 4:
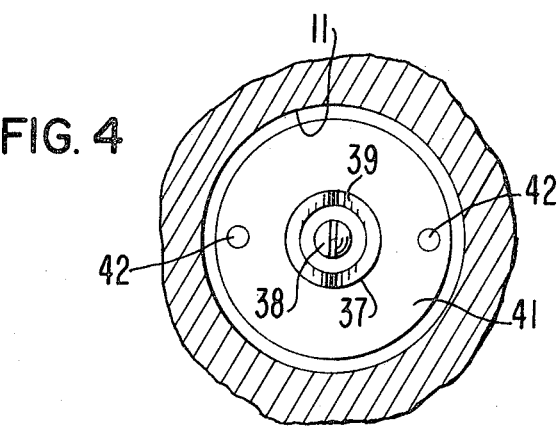
FIG. 4 is an enlarged sectional view of a portion of the structure of FIG. 2 taken along line 4—4 in the direction of the arrows.

A tubular cutting tool 37 is carried centrally of the valve disc 16 from the valve plate 17 via a screw 38, see FIGS. 3 and 4. The tubular cutting tool 37 is closed at the end abutting the valve disc 17 to receive a holding screw 38. The other end of the tool 37 is open and tapered to a point 39 to facilitate cutting through the diaphragm 35. An annular flange 41 is affixed to the tubular cutting tool 37. A pair of pins 42 are affixed to the flange 41 and extend axially of the passageway 11 into a pair of bores 43 in the valve seat structure 15 to prevent turning of the tool 37 and flange 41 while permitting axial translation of the tool and flange 37 and 41, respectively. The tubular cutting tool 37 has an outside diameter substantially smaller than the inside diameter of the surrounding gas passageway 11 and the wall of the tubular tool 37 is apertured at 44 to provide gas communication between the interior of the cutting tool 37 and the surrounding annular portion of the gas passageway 11.

In operation, valve 14 is normally in the closed position due to the spring bias force which causes the valve disc 16 to bear in sealing engagement with the valve seat 15. A sorption vacuum pump 9 is threadably inserted through the open end of the valve housing 22. When the threaded tubular extension 32 of the sorption vacuum pump 9 is threadably inserted to the extent that the O-ring 36 engages the smooth interior wall portion of the gas passageway 11, a vacuumtight seal is produced therebetween, thereby sealing the lower end of the valve housing 22. Further rotation of the sorption vacuum pump 9 causes the diaphragm 35 to come into engagement with the pointed portion 39 of the cutting tool 37. Further rotation causes the cutting tool to penetrate and to cut a circular opening in the diaphragm 35 to place the sorption pump 9 in gas communication with the sealed region of the valve housing 22 between the valve 14 and the diaphragm 35. The sorption pump 9 then evacuates this region below the closed valve 14. After this region has been evacuated, i.e., 30 seconds, further rotation of the vacuum sorption pump 9 causes the marginal edge portion of the diaphragm 35, which has not been cut, to come into engagement with the flange 41, thereby urging the valve 14 to an open position against the action of the spring 28. Thus, the valve 14 is open and the vacuum sorption pump 9 is placed in gas communication with the membrane gas separator through the gas passageway 11 and open valve 14.

To remove the sorption vacuum pump secondary evacuated structure for replacement, the sorption vacuum pump 9 is rotated in the opposite direction to cause the threaded tubular extension 32 to move outwardly in a downward direction through the open end of the valve housing 22. The sealing ring 36 maintains a seal while the diaphragm moves away from the flange 41 to allow the spring 28 to close the valve 14. After the valve 14 has been closed further rotation of the sorption vacuum pump 9 allows the pump to be removed for subsequent replacement by a replacement pump.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An evacuated system comprising a primary evacuated structure including a membrane gas separator, means for passing gas to be analyzed into said gas separator, a secondary evacuated structure including a vacuum pump for pumping on said gas separator, means forming a mass spectrometer coupled to an output of said gas separator for analyzing the separated constituents of the gas to be analyzed, means forming a gas passageway communicating between said primary and secondary structures, a valve affixed to said primary structure and in said gas passageway including spring means for spring-biasing said valve toward a normally closed position for sealing off said gas passageway, a diaphragm affixed to said secondary structure for sealing off said secondary structure means for sealing said secondary structure to said gas passageway, means in said gas passageway between said valve and said diaphragm for opening said diaphragm including a cutting tool for puncturing said diaphragm, and means for opening said valve for placing said secondary structure in gas communication with said primary structure via said gas passageway including a flange on said cutting tool, said flange being disposed to engage said diaphragm and to urge an extension of said cutting tool against said valve to move said valve to an open position against the spring bias force of said spring means as said secondary structure is moved toward said valve.

* * * * *